UNITED STATES PATENT OFFICE 1,955,316

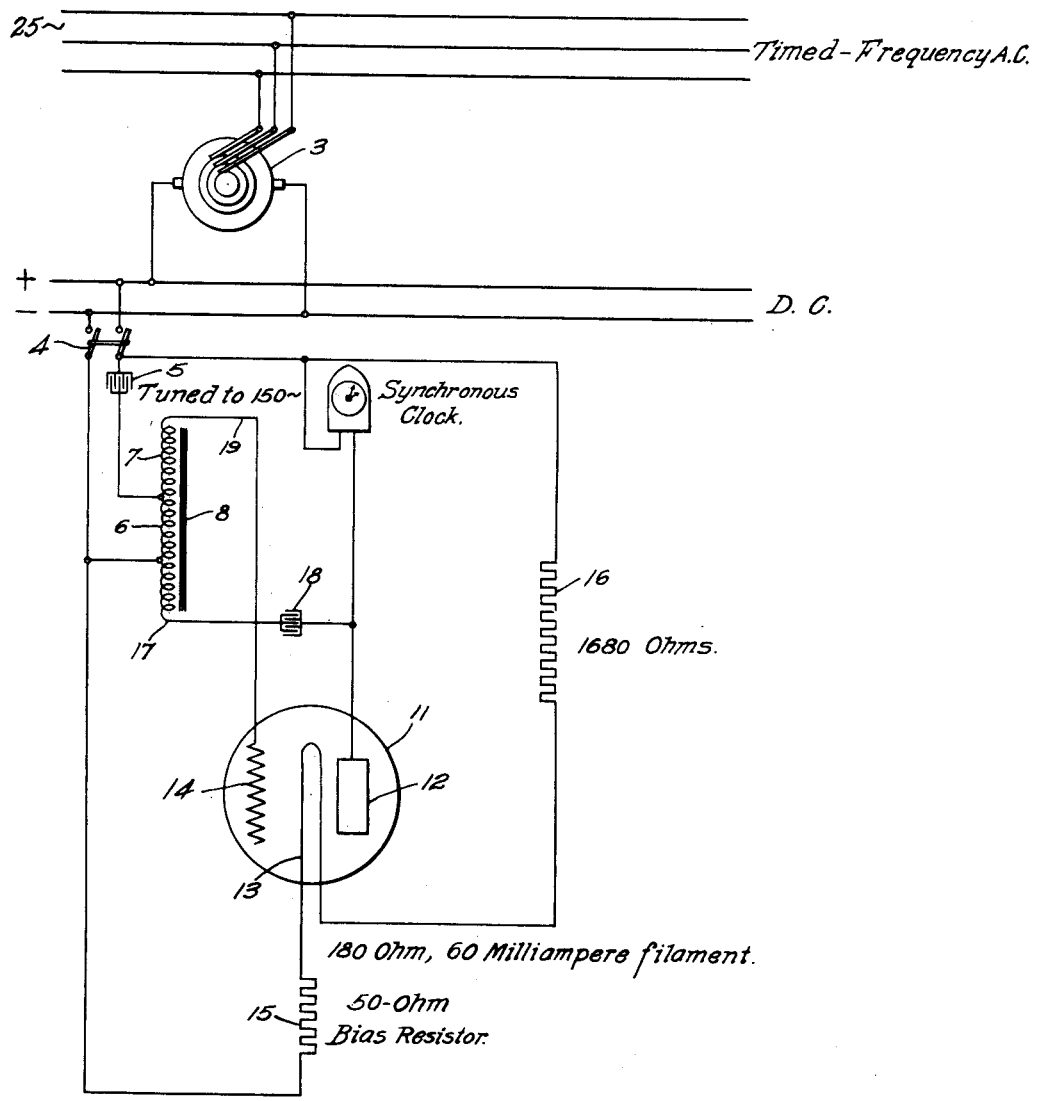

HARMONIC-FREQUENCY TIMING SYSTEM

Roy J. Wensley, South Orange, N. J., assignor to Westinghouse Electric & Manufacturing Company, East Pittsburgh, Pa., a corporation of Pennsylvania Application September 10, 1932, Serial No. 632,512

12 Claims. (Cl. 171—97)

My invention relates to means for getting synchronous timing service, for secondary clocks, from an ordinary commercial direct-current power-distribution system, and to amplifier means for taking off and amplifying the sixth-harmonic 150-cycle ripple which appears as a ripple on a direct-current system which is fed from 25-cycle rotary converters connected to a timed-frequency system.

The public has come to realize the tremendous advantages of synchronous secondary clocks, or clocks utilized at subscribers' stations and driven by mechanism which is caused to run synchronously with the impulses of a timed-frequency alternating-current commercial power circuit. It is a principal object of my invention to make these advantages obtainable in those localities which are supplied with direct-current distribution lines. In the direct current network of New York city alone, there is a large potential market for synchronous clocks, which has been estimated at half a million clocks. The direct-current Edison network there is fed entirely from 25-cycle converters which are energized from 25-cycle lines which are in turn derived from the timed-frequency 60-cycle network, so that there is a pronounced sixth-harmonic of 150 cycles which appears as a timed-frequency ripple on top of the direct current.

The principal object of my invention is to take this timed-frequency ripple, amplify it, and utilize it for driving synchronous clocks from the direct-current power-distribution system.

With the foregoing and other objects in view, my invention consists in the systems, apparatus and combinations hereinafter described and claimed and illustrated in the accompanying drawing, the single figure of which is a diagrammatic view of circuits and apparatus embodying my invention in a form which at present appears to be preferable.

By way of example, I have shown a timed-frequency 25-cycle commercial power system 1 supplying energy to a direct-current commercial power-distribution system 2 through a converter 3 of any description.

My improved timing mechanism is shown as being connected to the direct-current lines 2 through a switch 4 or any other suitable connecting means. My timing apparatus includes primarily a tuned or resonant circuit comprising a capacitor 5 and the central turns 6 of an autotransformer 7, said tuned circuit being tuned to the sixth-harmonic of the 25-cycle system, or to a frequency of 150 cycles, or to the frequency of any other ripple which appears on the direct-current line 2. The autotransformer 7 is preferably wound on an iron core 8.

The effect of the capacitor 5 is to exclude the direct current from the tuned circuit, and the reactor 6 thus develops a voltage which includes only the alternating-current ripple on the direct-current lines. Power is supplied to any kind of synchronous clock or timing instrument 9 by means which are associated with the reactor 6, so that said clock or timing instrument may synchronize with the ripples which traverse the reactor.

It is usually necessary, to very considerably amplify the ripple currents traversing the reactor 6, and to this end I have shown a preferred amplifier arrangement consisting of a controlled, hot-cathode, amplifier tube 11 having a plate 12, a hot cathode or filament 13 and a controlling grid 14. The filament 13 is energized directly across the direct-current circuit 2 which is the same as being directly across the tuned circuit 5—6, by means of a small biasing resistor 15 which is connected to the negative terminal, and a large current-limiting resistor 16 which is connected to the positive terminal, as shown. The drawing indicates resistance values which are appropriate for a 60-milliampere filament operating on a 115-volt direct-current line 2, although it will be understood that I am not limited to any particular values.

The plate circuit of the amplifier 11 includes the biasing resistor 15, the filament 13, the plate 12, and the synchronous clock 9.

The grid 14 is energized from the reactor or autotransformer 7. To this end, the terminal 17 of the autotransformer, which is closest to the negative line connection, is connected to the plate 12 through a feed-back capacitor 18. The other terminal 19 of the autotransformer is shown as being connected directly to the grid 14. The feed-back is adjusted to give maximum stable regeneration, so as to obtain all possible voltage amplification, or any desired degree thereof.

In operation, the tuned circuit 5—6 selects the 150-cycle ripple from the direct-current line 2 and causes it to flow with a minimum of impedance in said tuned circuit. The amplifier 11 derives power directly from the direct current of the line, but by virtue of its grid or other control, which is coupled to the tuned circuit 5—6, it is caused to supply unidirectional intermittent current impulses to the clock 9, in response to the 150-cycle circuit. The clock must be one, of course, which operates satisfactorily on the frequency with which it is supplied.

It will be obvious that my invention, in its broadest aspects, is not limited to the precise means and combinations for supplying the clock 9 with suitable alternating or pulsating current for driving it synchronously. I desire, therefore, that the appended claims shall be accorded the broadest construction permitted by their language and the prior art.

I claim as my invention:

1. Timing mechanism for operation on a commercial direct-current power circuit of a type having a superposed timed-frequency harmonic ripple, comprising means for deriving a ripple current from such a circuit, a synchronously operating electric clock motor mechanism energized from said means and time-mechanism controlled by said motor mechanism.

2. Timing mechanism for operation on a commercial direct-current power circuit of a type having a superposed timed-frequency harmonic ripple, comprising means for deriving a ripple current from such a circuit and amplifying the same, a synchronously operating electric clock motor mechanism energized from said means, and time-mechanism controlled by said motor mechanism.

3. The combination with a commercial direct-current power-distribution circuit having a superposed timed-frequency harmonic ripple, of tuned-circuit means for deriving an alternating current of predetermined frequency from said direct-current circuit, and a synchronously operating electric clock mechanism energized from said means.

4. The combination with a commercial direct-current power-distribution circuit having a superposed timed-frequency harmonic ripple, of tuned-circuit means for deriving and amplifying an alternating current of predetermined frequency from said direct-current circuit, and a synchronously operating electric clock mechanism energized from said means.

5. A timing system comprising a timed-frequency alternating-current commercial power system, a direct-current commercial power system, converting means connected between the two systems whereby a timed-frequency ripple appears on the direct-current system from the alternating-current system, means for selectively removing current of said ripple frequency from said direct-current system, and means for utilizing said selected ripple-frequency current for maintaining a timing mechanism in substantial synchronism therewith.

6. A timing system comprising a timed-frequency alternating-current commercial power system, a direct-current commercial power system, converting means connected between the two systems whereby a timed-frequency harmonic of the alternating-current system appears as a ripple on the direct-current system, a capacitor connected across the direct-current system, and means for utilizing the ripple-frequency current of said capacitor for maintaining a timing mechanism in substantial synchronism therewith.

7. Timing mechanism comprising a resonant circuit including a capacitor and a reactor in series with each other, a synchronous timing instrument, and means associated with said reactor for supplying said instrument with power.

8. Timing mechanism comprising a resonant circuit including a capacitor and a reactor in series with each other, a synchronous timing instrument, and means associated with said reactor for supplying said instrument with power, said means comprising a controlled rectifier energized from across the terminals of said resonant circuit and controlled from said reactor.

9. Timing mechanism comprising a resonant circuit including a capacitor and a reactor in series with each other, a synchronous timing instrument, and means associated with said reactor for supplying said instrument with power, said means comprising a controlled hot-cathode rectifier, means for energizing the cathode of said rectifier from across the terminals of said resonant circuit with a resistor on each side of said cathode, means for energizing the plate circuit of said rectifier from across the terminals of said resonant circuit, means for energizing the controlling circuit of said rectifier from said reactor with a feed-back connection from said plate circuit, and means for energizing said timing instrument from said plate circuit.

10. Timing mechanism comprising a resonant circuit including a capacitor and intermediate turns of an autotransformer in series with each other, a synchronous timing instrument, a controlled hot-cathode rectifier comprising a plate-circuit and a controlling grid, means including series resistance means for energizing the hot cathode from the plate-circuit, means for connecting the negative terminal of said plate-circuit to a terminal of said tuned circuit at an intermediate tap on said autotransformer, means for connecting the adjacent end of the autotransformer to the plate-circuit through a feed-back capacitor, means for connecting the other end of the autotransformer to the grid, and means for energizing said timing instrument from said plate circuit.

11. Amplifying mechanism comprising a resonant circuit including a capacitor and intermediate turns of an autotransformer in series with each other, a controlled hot-cathode rectifier comprising a plate-circuit and a controlling grid, means including series resistance means for energizing the hot cathode from the plate-circuit, means for connecting the negative terminal of said plate-circuit to a terminal of said tuned circuit at an intermediate tap on said autotransformer, means for connecting the adjacent end of the autotransformer to the plate-circuit through a feed-back capacitor, and means for connecting the other end of the autotransformer to the grid.

12. Amplifying mechanism comprising a resonant circuit including a capacitor and a reactor in series with each other, a controlled hot-cathode rectifier, a direct-current supply circuit for the plate-circuit of said rectifier, means for energizing the cathode of said rectifier from said direct-current supply circuit with a resistor on each side of said cathode, and means for energizing the controlling circuit of said rectifier from said reactor with a feed-back connection from said plate circuit.

ROY J. WENSLEY.